Oct. 20, 1959

ADRIENNE BAUCHART
NEE ECHEGUT
THREAD-CUTTING DEVICE 2,909,091

Filed March 5, 1954

INVENTOR
ANDRIENNE BAUCHART

ATTORNEYS

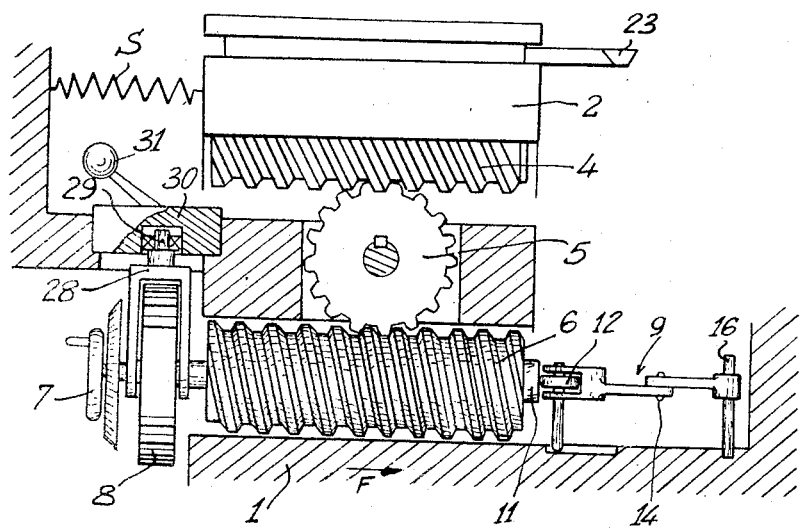
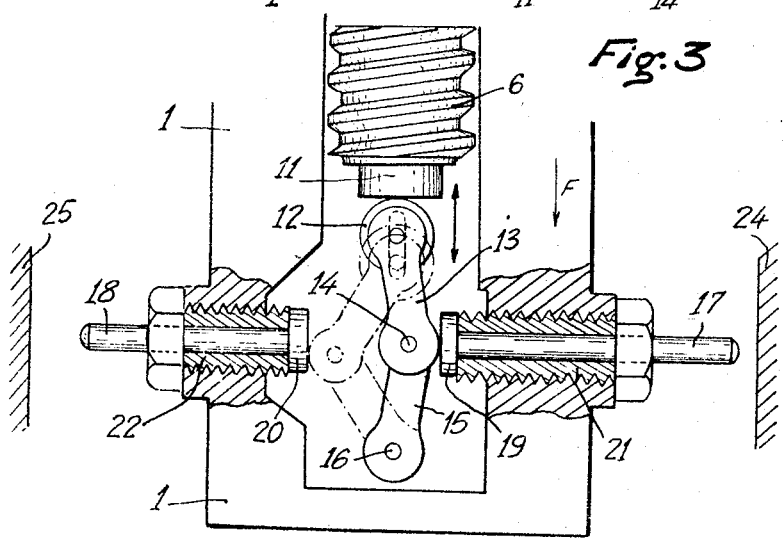
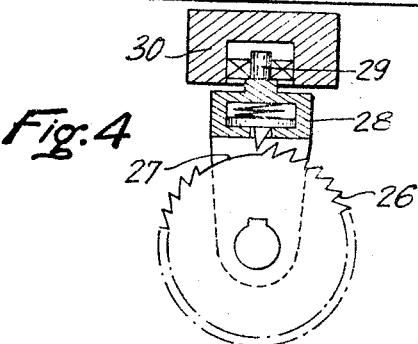

Oct. 20, 1959
ADRIENNE BAUCHART
NEE ECHEGUT
THREAD-CUTTING DEVICE
2,909,091
Filed March 5, 1954
3 Sheets-Sheet 3
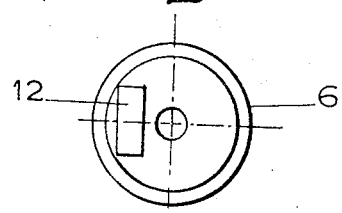
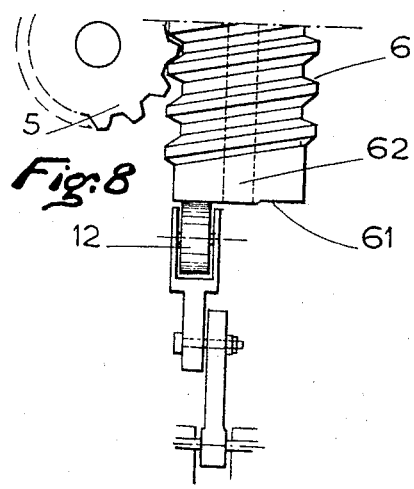
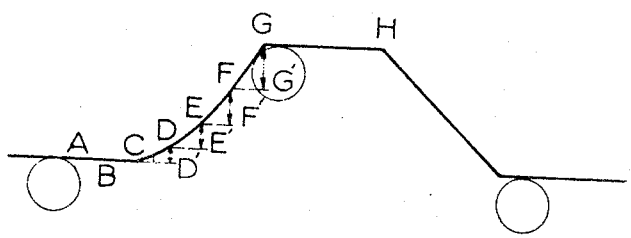
INVENTOR
ANDRIENNE BAUCHART
ATTORNEYS

2,909,091
THREAD-CUTTING DEVICE

Adrienne Bauchart, nee Echegut, La Courneuve, France

Application March 5, 1954, Serial No. 414,351

Claims priority, application France March 7, 1953

10 Claims. (Cl. 82—5)

My invention has for its object means for executing threads of any type and size, both on special thread-cutting machines and on slide lathes. It has also for its object to allow such thread-cutting operations to be executed by an unskilled workman.

Furthermore, it has for its object the automatic execution, more particularly on a slide lathe, of at least part of the thread-cutting steps.

It has finally for its object the execution of means for producing the above disclosed results in a comparatively simple manner, the device obtained being of a small bulk and of a low price.

My improved device which is mounted e.g. on the saddle of a slide lathe, may be positioned in a manner such that the tool carried by it may engage the rod to be cut, either perpendicularly or preferably obliquely, the position of the tool-carrier being adapted to assume various angular positions with reference to the saddle.

The tool carrier which may slide laterally with reference to the saddle includes automatic means adapted to produce a return of the tool at the end of each cut and controlled e.g. by means of an adjustable stop which is stationary with reference to the lathe bench, said arrangement providing the desired sudden return movement of the tool.

The position of the tool at the beginning of each cut may also be obtained automatically, preferably by means of a further stationary stop the position of which is, however, adjustable with reference to the bench of the lathe.

The two above mentioned stops cooperate preferably with a system of pivotally interconnected links, which system, when operative, is held in a position corresponding substantially to unstable equilibrium and beyond which the links are urged back suddenly by a spring. The stop producing the automatic return of the tool acts then on the links so as to make them pass through the position of unstable equilibrium and the spring urges the links into a sudden movement which is transmitted, by means of a system including e.g. a rack and a pinion, to the actual tool carrier. The reverse movement bringing the tool into its operative position may then be produced by the other stop acting in the opposite direction on the system of links, in antagonism with the spring so as to urge the system back into its operative position.

At each cut, the feed of the tool may be rendered automatic through action on a worm forming part of the kinematic chain connecting the links with the tool, the depth of feed being predetermined.

To this end, I may resort e.g. to a ratchet wheel associated with a pawl actuated automatically each time the tool recedes. It is also possible to provide an arrangement adapted to make the ratchet wheel revolve each time by a predetermined number of teeth. Lastly, part of the periphery of said ratchet wheel is advantageously smooth so as not to be driven any longer by the pawl when the thread has been cut to the desired depth. It is also possible to provide a longitudinal shifting of the worm in association with its rotary movement, said longitudinal shifting being obtained e.g. by a slope formed on the terminal surface of the worm and held in contact with the adjusting abutment which produces the automatic return of the tool.

Further objects and features of my invention will appear in the reading of the following description, reference being made to accompanying drawings illustrating diagrammatically, by way of example and by no means in a limiting sense, a preferred embodiment of my invention, as applied to a device for cutting threads in an entirely automatic manner on a slide lathe. In said drawings:

Fig. 2 is a diagrammatic detail view showing the system controlling the return and feed movements of the tool;

Fig. 3 is a diagrammatic detail view showing the system of links controlling said return and feed movements of the tool;

Figs. 4 and 5 are further diagrams showing the ratchet wheel and pawl system associated with control means adapted to shift in a predetermined manner the tool for the successive cuts to be made thereby, Fig. 5 being drawn on a larger scale than Fig. 4;

Figs. 7, 8 and 9 illustrate a modification of the control means incorporating a worm as illustrated in Figs. 2, 3, 4 and 5.

Over the bed of the slide lathe, a longitudinal carriage controlled in the conventional manner by a master screw is adapted to move. The artnsverse carriage or cross-slide moves over the longitudinal carriage under the conventional control of a crank and a worm, while the tool carrier illustrated separately in Fig. 1 and which may be locked by any known or suitable means in any desired angular position with reference to the transverse carriage is pivotally secured to said cross-slide 2. The latter is adapted to move along the slideways 3 over the longitudinal carriage or slide 1 through any known means, e.g. with the interposition of a needle bearing.

Figure 1:
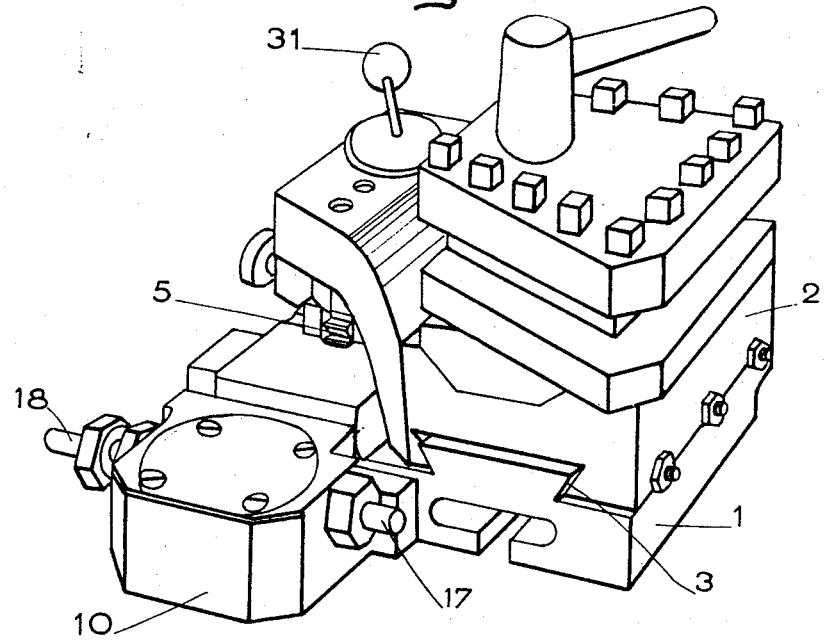
Fig. 1 is a perspective view of an arrangement according to my invention, adapted to be fitted on the saddle of a slide lathe over the transversely moving carriage of the latter.

The cross-slide 2 carrying the tool carrier is provided with a rack 4 which is not visible in Fig. 1 but which has been illustrated separately in Fig. 2 and meshes constantly with a pinion 5 revolubly carried by the lower slide 1. This rack has its thread shaped so as to operatively engage the teeth on the pinion 5 which is of the wormwheel type.

Furthermore, the pinion 5 is in permanent engagement with a worm 6 also acting as a rack and adapted to revolve and to slide inside a bore of the lower slide 1. This worm 6 is angularly rigid with a controlling hand wheel 7 and with a ratchet wheel 8 revolving thus in unison with said worm 6. The other end of the worm acts on toggle links 9 which have been illustrated with further detail in Fig. 3, said toggle links being enclosed inside a casing 10 carried by the slide 1 as illustrated in Fig. 1. In Fig. 3, the worm 6 is shown as carrying at its end facing the toggle links a stop 11 engaging a roller 12 carried by the link 13 which is pivotally secured in its turn at 14 to another link 15 pivotally secured at 16 to the slide 1. The toggle links 13—15 are adapted to assume either of two positions illustrated respectively in solid lines and in dot-and-dash lines in Fig. 3. The solid-line position corresponds to the operative position of the tool for which the two links are thus in substantial alignment, although Fig. 3 shows the small angle formed by them in a marked manner so as to make it more apparent. The dot-and-dash position corresponds to the receded position of the tool 23.

Between the lower slide 1 and the upper slide 2 is inserted a conventional constantly stressed return spring S acting on the rack 4 and consequently urging the tool 23 into its receded inoperative position. The rack 4 as it moves under the action of the spring S urges through the pinion 5 the worm 6 into movement in a direction opposed to its own.

Two rods 17 and 18 provided with stops 19 and 20 defining the outer limits of the travel allowed for the toggle links 13—15 are furthermore adapted to slide in corresponding recesses 21 and 22 formed in threaded sleeves the positions of which are adjustable inside the body of the slide 1, whereby the travel allowed for said rod is also adjustable. The stop 19 serves for limiting the movement of the links beyond the position illustrated in solid lines and which is extremely near the accurately aligned position of the links, which latter aligned position is, as will be readily ascertained, a position of unstable equlibrium.

The rods 17 and 18 cooperate in their turn at their outer ends with the stops 24 and 25 respectively, which are adjustably secured to the bed of the lathe.

The position of the toggle links illustrated in Fig. 3 in dot-and-dash lines corresponds to a position of the worm 6 engaging the roller 12 under the action of the spring S acting on the rack 4 and consequently in the opposite direction, that of the arrow, on the worm 6. The toggle links end facing the stop 11 is obviously guided in parallelism with the axis of the worm 6.

Figure 5:
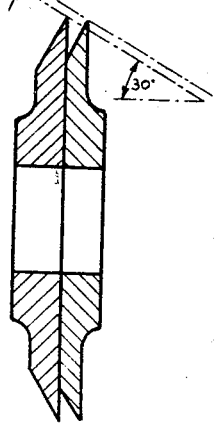

Furthermore and as mentioned hereinabove, the spindle carrying the worm 6 also carries the ratchet wheel 8 which has been illustrated more clearly in Fig. 4. Said wheel which may be stationary or rigid with the worm is provided with a number of teeth 26 and with a smooth peripheral section 27. The ratchet wheel meshes, as shown diagrammatically in Fig. 2, with a pawl 28 the carrier of which is pivotally secured through a strap to the spindle carrying the wheel and including a tail-piece 29 as illustrated in Figs. 2 and 5. Said tail-piece slidingly engages a rectilinear guiding slot formed in a surface of a cylindrical member 30 carried by the upper slide 2 which is parallel with the axis of the ratchet wheel, said slot crossing more or less obliquely the plane of the ratchet wheel. Again the member 30 may be rigid with the slide 1 or with the bed, provided the ratchet wheel is constrained to move translationally with reference to the member 30 during the translational movement of the slide 2. The member 30 may in fact be angularly adjusted so as to make the slot therein occupy selectively a plurality of angular positions round the geometrical projection of the center of the ratchet wheel on the plane in which the slot is formed, as shown in dotted lines in Fig. 5, under the control of the lever 31 rigid with the cylindrical member 30 (Fig. 5). When the tool is caused to recede under the action of the spring S, the member 28 recedes in unison therewith and causes the pawl tail-piece, which is constrained to remain in the stationary plane of the ratchet wheel, to rock round the axis of the latter while it is guided in the oblique slot. This has for its result to provide for an angular shifting of the ratchet wheel 8 by the pawl through one or more teeth according to the obliquity given to the slot. It is apparent that the pivotal movement of the pawl round the worm axis is defined as to amplitude through the drive of the tail-piece 29 by points of the slot surface, which allows a greater amplitude of movement when said points are nearer said geometrical protection, i.e. when the slot in the member 30 is further from parallelism with the axis of the worm.

The device disclosed operates as follows: said device being positioned on the lathe and being brought into its operative position, a first adjustment is proceeded with so as as to define on one hand the number of cuts to be executed according to the hardness of the metal undergoing treatment and to the desired depth of the thread and on the other hand the feed of the tool for each cut, according to the nature of the metal; according as to whether said metal is more or less hard, the feed of the tool should, as a matter of fact, be more or less long for each cut. To this end, the angular position of the slotted member 30 is first adjusted so that for each receding movement of the tool and of its carrier and consequently of the worm spindle geared thereto, the tail end 29 of the pawl moving inside said slot to a predetermined extent constrains said pawl to progress by a predetermined angle, the result of which is a progression of the ratchet wheel by one, two or more teeth at each step, as explained hereinafter. At the same time as this adjustment of the member 30, the starting position of the ratchet wheel 8 with reference to the pawl 28 is adjusted angularly by hand so as to define the total depth of engagement of the tool through the number of teeth shifted in front of the pawl. This has for its result a rotation of the worm 6 by the same amount as the ratchet wheel and a consequent shifting of the rack and of the tool.

This being understood, at the beginning of each operative cut, the toggle links 13, 15 occupy the position illustrated in solid lines in Fig. 3, while the worm 6 engages the roller 12 and remains in contact therewith against the action of the spring S throughout the operative cut. At the end of said cut, the rod 17 on the slide 1 impinges through its outer end against the stationary stop 24. Said stop urges the pivotal connection 14 back and after said pivotal connection has moved beyond the straight line connecting the roller 12 with the pivot 16, the worm 6 is released so that the gearing 4—5—6 moves under the action of the spring S. This causes the tool 23 to recede and the worm 6 to move in the direction of the arrow F and to urge the roller 12 into its dot and dash-lined position. This movement of the gearing 4—5—6 has for its result an angular movement of the ratchet wheel 8 as a consequence of the shifting of the pawl tail-piece in its slot and thereby a rotation of the worm 6 rigid with said ratchet wheel and consequently of the pinion 5. The latter, acting in its turn on the rack 4, feeds at each cut the tool 23 by a predetermined amount, which increases correspondingly the depth of cut. When the ratchet wheel has revolved by a sufficient amount for the pawl to have reached the smooth section of the ratchet wheel, the movements of the pawl will no longer act on the ratchet wheel and consequently the tool 23 is at a standstill and the cutting operation is at an end. After each cut, the slides are returned into their starting positions and this movement may be performed either by hand or in an entirely automatic manner. When the slide 1 has returned into its starting position, the rod 18 impinges against the stop 25 whereby the toggle links 13, 15 are returned gradually into their starting position illustrated in solid lines. The tool is now ready for a further cutting stage since it has been fed as disclosed by a predetermined constant amount.

It may, however, be of interest to provide a feed of the tool, which is constant during the first operative stages and decreases gradually during the last stages including the final cutting stage defining the maximum depth of the groove which it desired to produce.

To this end and while retaining, as provided by the ratchet wheel and pawl system, a rotary movement of constant amplitude for the worm 6 before each operative stage, the corresponding rotary movement of the pinion 5 is reduced gradually by submitting the worm 6 to a translational movement of increasing amplitude before each of the last operative stages, whereby it is possible to obtain a rotary movement of the pinion 5, the total amplitude of which is each time smaller. This result may be obtained in particular by causing the abutment roller 12 to act on the end of the worm 6 no longer through its center but eccentrically as provided by forming on the end of said worm a suitably shaped slope. The consequence is that the worm 6, revolving by a predetermined amount before each operative stage, will engage the roller 12 through the agency of said slope and will consequently assume for each of the last cuts a different longitudinal position the location of which depends on the shape of the slope.

Figs. 7, 8 and 9 illustrate such an arrangement.

Figs. 7 and 8 are a front view and a view from above of the end of the worm 6, the roller 12 engaging eccentrically the end of the worm.

Fig. 9 is a development on a plane of the annular line described on the worm by the medial contacting point of the roller 12 engaging the slope formed on the terminal surface of the worm; this development shows the shape of the slope formed on the worm, the gradient of said slope being considerably exaggerated on the drawing so as to further the understanding of the latter.

Figure 6:
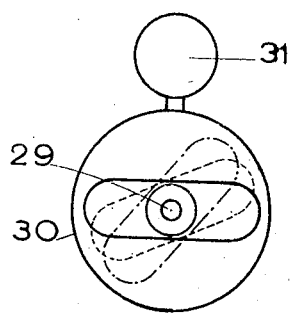
Fig. 6 shows a tool adapted for use in accordance with the invention for the simultaneous cutting of two convolutions of the screw thread.

In Figs. 7 and 8, 6 designates as precedingly the worm adapted to be shifted inside the slide 1 while remaining in constant mesh with the pinion 5, said worm being submitted between the successive cutting stages to a rotary movement defined by the ratchet and pawl system 28—29—30—31, which has not been redrawn on Figs. 7 and 8. The worm 6 carries at its end adapted to engage the roller 12 a slope 61 extending substantially throughout the transverse cross section of the worm and against which the roller 12 is urged eccentrically as apparent from inspection of Fig. 8. For sake of an easier production of the slope described hereinafter, the slope 61 and the worm carrying it are provided throughout with an axial bore 62.

According to my invention, the surface of the stop engaged by the roller 12 is not flat throughout its periphery and includes a slope over a small section thereof. Supposing for instance the ratchet and pawl system produces at each operation a revolution of the worm 6 through 1/40 of a revolution, which corresponds for instance to a feed of the tool by 10/100 of a mm., while the roller 12 remains on the flat section of the stop 61, it will be further assumed that it is desired for the tool to progress during the last cutting stages only by 7/100 of a millimeter, then by 5/100 and finally by 3/100. This stop will be given the shape illustrated in Fig. 9 as developed. The longitudinal subdivisions of the curve thus obtained correspond each to 1/40 of a revolution of the worm. As long as the last operative stages have not been reached, i.e. in those positions for which the roller 12 is urged against the flat area of the worm at points A—B—C, the worm 6 returns exactly at the beginning of each operative stage into the same longitudinal position in the slide 1. Now, whenever the rotary movements of the worm are identical, the tool 23 is fed each time by a constant amount which is equal for instance to 10/100 of a mm. When the last operative stages are reached, the roller engages the actual slope on the worm and bears against it at the point D, for instance. Since the longitudinal position of the roller does not change, the worm 6 is adapted to be shifted longitudinally by an amount equal to D—D', i.e. say 3/100 of a mm. This shifting of the worm causes the tool 23 to recede by a corresponding amount, but as said tool progresses however under the action of the rotation of the worm 6 by 10/100 of a mm. its actual feed is altogether only 7/100 of a mm. For the following operative step, the roller engages the slope at E. Supposing the distance E—E' is equal to 5/100 of a mm. for instance the tool will be fed for the same reason as hereinabove by only 5/100 of a mm. During the next operative step, the roller enters the position F and supposing the distance F—F' is equal to 7/100 of a mm., the feed will be only 3/100 of a mm. Lastly for the following, last stage, the roller enters the position G and the distance G—G' being equal to 9/100 of a mm. the feed will be only 1/100. From this moment onwards, the pawl 28 engaging the smooth section of the ratchet wheel will no longer produce any rotation of the worm so that no feed is imparted to the tool 23. During this last movement, the roller 12 moves over a flat section G—H of the end of the worm, which is parallel to the main area A—B—C. This flat area G—H is connected beyond the point H with the other end of the flat main area A—B—C by a slope of any desired shape, for instance a plane at 45° which returns the roller into its starting position. As apparent from inspection of the example disclosed, the total depth separating the upper flat area GH from the flat main area A—B—C, is equal to 3+5+7+9/100, i.e. 0.24 mm.

Obviously, the arrangement which has just been described allows obtaining in accordance with the shape given to the slope all modifications in the desired feed, which feed may be defined before operation according to requirements.

Fig. 6 shows a double tool adapted to be mounted in lieu of the tool 23 and which allows cutting simultaneously according to my invention two adjacent convolutions of a thread.

Obviously, various modifications may be brought to the arrangement disclosed, without unduly widening thereby the scope of the invention as defined in accompanying claims.

In order to provide for a perfectly reliable operation of the ratchet and pawl system described with reference to Figs. 4 and 5, it is possible to duplicate it. Furthermore, the stops 17 and 18 may include a hydraulic transmission system adapted to transfer their action onto any points of the slide 1 which provides for a greater adaptability in the execution and in the mounting of the machine.

What I claim is:

1. A compound slide rest, comprising an upper tool-carrying slide, a lower slide over which said upper slide is adapted to move along a predetermined straight line, said lower slide being adapted to move along a line perpendicular to said straight line, a member carried by the lower slide and adapted to move along a line parallel with last-mentioned straight line to control the movement of said upper slide along the said straight line, elastic means interconnecting the two slides and urging the upper slide along said straight line into a predetermined inoperative position with reference to the lower slide, toggle links fitted between the lower slide and the member movable thereon adapted to be shifted in a plane parallel with both directions of movement between a first substantially aligned position very slightly to one side of the accurately aligned position thereof parallel with the direction of movement of the upper slide and a second position clearly to the other side of said accurately aligned position, said toggle links urging the member movable on the lower slide into movement against the pressure of the elastic means when moving towards their first position and releasing said member when moving towards their second position to allow said member to recede under the action of the elastic means urging the upper slide into its inoperative position, stationary stops facing opposite sides of the toggle links and in the plane thereof, members carried by the lower slide in registry with and in the plane of the toggle links to either side thereof and adapted to slide in said lower slide in parallelism with the direction of movement of the latter and to be engaged alternatingly by each stop to be shifted thereby against the direction of movement of the lower slide at the end of the movement of the latter in the corresponding direction towards said stops to thereby shift the toggle links from one of their first and second positions into the other respectively and thereby provide for the movement of the upper slide in the corresponding directions selectively under the action of the return of the toggle link into its first position and under the pressure of the elastic means.

2. A compound slide rest, comprising an upper tool-carrying slide, a lower slide over which said upper slide is adapted to move along a predetermined straight line, said lower slide being adapted to move along a line perpendicular to said straight line, a member carried by the lower slide adapted to slide therein in parallelism with the line of movement of the upper slide and provided with a row of teeth along its direction of sliding, a pinion rotatably carried by the lower slide round an axis parallel with the direction of movement of the lower slide and meshing with the teeth on the slidable toothed member, a rack rigid with the upper slide, parallel with the line followed by the latter and meshing with the pinion, elastic means interconnecting the two slides and urging the upper slide along said straight line into a predetermined inoperative position with reference to the lower slide, toggle links fitted between the lower slide and the toothed member movable thereon and adapted to be shifted in a plane parallel with both directions of movement between a first substantially aligned position very slightly to one side of the accurately aligned position thereof parallel with the direction of movement of the upper slide and a second position clearly to the other side of said accurately aligned position, said toggle links urging the toothed member movable on the lower slide into movement against the pressure of the elastic means when moving towards their first position and releasing said member when moving towards their second position to allow said member to recede under the action of the elastic means urging the upper slide into its inoperative position, stationary stops facing opposite sides of the toggle links and in the plane thereof, members carried by the lower slide in registry with and in the plane of the toggle links to either side thereof and adapted to slide in said lower slide in parallelism with the direction of movement of the latter and to be engaged alternatingly by each stop to be shifted thereby against the direction of movement of the lower slide at the end of the movement of the latter in the corresponding direction towards said stop to thereby shift the toggle links from one of their first and second positions into the other respectively and thereby provide for the movement of the upper slide in the corresponding direction, selectively under the action of the return of the toggle link into its first position through actuation of the toothed member, pinion and rack and under the pressure of the elastic means.

3. A compound slide rest, comprising an upper tool-carrying slide, a lower slide over which said upper slide is adapted to move along a predetermined straight line, said lower slide being adapted to move along a line perpendicular to said straight line, a movable member carried by the lower slide and adapted to move along a line parallel with last-mentioned line to control the movement of said upper slide along the said straight line, elastic means interconnecting the two slides and urging the upper slide along said straight line into a predetermined inoperative position with reference to the lower slide, toggle links fitted between the lower slide and the member movable thereon and adapted to be shifted in a plane parallel with both directions of movement between a first substantially aligned position very slightly to one side of the accurately aligned position thereof parallel with the direction of movement of the upper slide and a second position clearly to the other side of said accurately aligned position, said toggle links urging the member movable on the lower slide into movement against the pressure of the elastic means when moving towards their first position and releasing said member when moving towards their second position to allow said member to recede under the action of the elastic means urging the upper slide into its inoperative position, stationary stops facing opposite sides of the toggle links and in the plane thereof, members carried by the lower slide in registry with and in the plane of the toggle links to either side thereof and adapted to slide in said lower slide in parallelism with the direction of movement of the latter and to be engaged alternatingly by each stop to be shifted thereby against the direction of movement of the lower slide at the end of the movement of the latter in the corresponding direction towards said stop to thereby shift the toggle links from one of their first and second positions into the other respectively and thereby provide for the movement of the upper slide in the corresponding direction, selectively under the action of the return of the toggle links into its first position and under the pressure of the elastic means, and adjustable mechanical means controlled by each elementary movement of the movable member on the lower slide under the action of the elastic means and shifting the inoperative position of the upper slide along its line of movement by a predetermined amount.

4. A compound slide rest, comprising an upper tool-carrying slide, a lower slide over which said upper slide is adapted to move along a predetermined straight line, said lower slide being adapted to move along a line perpendicular to said straight line a worm carried by the lower slide having its axis parallel with the line of movement of the upper slide and adapted to slide in parallelism with its axis, a pinion rotatably carried by the lower slide round an axis parallel with the direction of movement of the lower slide and meshing with the worm, a rack rigid with the upper slide, parallel with the line of movement of the latter and meshing with the pinion, elastic means interconnecting the two slides and urging the upper slide along said straight line into a predetermined inoperative position with reference to the lower slide, toggle links fitted between the lower slide and the worm movable thereon and adapted to be shifted in a plane parallel with both directions of movement between a first substantially aligned position very slightly to one side of the accurately aligned position thereof parallel with the direction of movement of the upper slide and a second position clearly to the other side of said accurately aligned position, said toggle links engaging the worm to shift same longitudinally to urge the upper slide into movement against the pressure of the elastic means when moving towards their first position and releasing said worm when moving towards their second position to allow the upper slide to recede under the action of the elastic means into its inoperative position and to shift the worm by an equal and opposite amount, stationary stops facing opposite sides of the toggle links and in the plane thereof, members carried by the lower slide in registry with and in the plane of the toggle links to either side thereof and adapted to slide in said lower slide in parallelism with the direction of movement of the latter and to be engaged alternatingly by each stop to be shifted thereby against the direction of movement of the lower slide at the end of the movement of the latter in the corresponding direction towards said stops to thereby shift the toggle links from one of their first and second positions into the other respectively and thereby provide for the movement of the upper slide in the corresponding directions selectively under the action of the return of the toggle link into its first position through actuation of the worm, pinion and rack and under the pressure of the elastic means.

5. In a compound slide rest as claimed in claim 4, the combination of a unidirectional rotary mechanism adapted when released and rotated to produce a predetermined angular movement of the worm and thereby a corresponding movement of the pinion and of the rack and a further mechanism wherethrough each longitudinal movement of the worm, under the action of the elastic means on the upper slide, releases and rotates the first-mentioned mechanism to shift the inoperative position of the upper slide along its line of movement by a predetermined amount.

6. In a compound slide, as claimed in claim 4, the combination of a ratchet wheel coaxial with and angularly rigid with the worm, a pawl pivotally secured to the ratchet wheel to hold the latter against rotation and means controlled by the translational movement of the worm under the action of the elastic means on the upper slide and adapted to angularly shift the ratchet wheel and worm to set said ratchet wheel at predetermined successive angles at the ends of the successive movements of the upper slide produced by the elastic means and thereby shift said upper slide into successive well defined inoperative positions.

7. In a compound slide, as claimed in claim 4, the combination of a ratchet wheel coaxial with and angularly rigid from the worm, a pawl pivotally secured to the ratchet wheel to hold the latter against rotation and adjustable means controlled by the translational movement of the worm under the action of the elastic means on the upper slide and adapted to angularly shift the the ratchet wheel and worm to set said ratchet wheel at predetermined successive angles at the ends of the successive movements of the upper slide produced by the elastic means and thereby shift said upper slide into successive well defined inoperative positions.

8. In a compound slide, as claimed in claim 4, the combination of a ratchet wheel coaxial with and angularly rigid with the worm, a pawl pivotally secured to the ratchet wheel to hold the latter against rotation and means controlled by the translational movement of the worm under the action of the elastic means on the upper slide and adapted to angularly shift the ratchet wheel and worm to set said ratchet wheel at predetermined successive angles at the ends of the successive movements of the upper slide produced by the elastic means and thereby shift said upper slide into successive well defined inoperative positions, and means controlled by the angular shifting of the worm and adapted to reduce the amplitude of the successive shiftings of the inoperative position of the slide by a predetermined amount.

9. In a compound slide rest as claimed in claim 4, the combination of a unidirectional rotary mechanism adapted, were released and rotated, to produce a predetermined angular movement of the worm and thereby a corresponding movement of the pinion and of the rack and a further mechanism wherethrough each movement of the worm, under the action of the elastic means on the upper slide, releases and rotates the first-mentioned mechanism to shift the inoperative position of the upper slide along its line of movement by a predetermined amount, and an annular cam raised on and axially rigid with the end of the worm facing the toggle links and engaging the latter and defining the amount of shifting of the inoperative position of the upper slide in direct relationship with the angular movement of the worm.

10. In a compound slide, as claimed in claim 4, the combination of a ratchet wheel coaxial with and angularly rigid with the worm, a pawl pivotally secured to the ratchet wheel to hold the latter against rotation, a rotary member fitted in the lower slide and the axis of which passes radially through the ratchet wheel, said member being provided with a diametrical slot facing said ratchet wheel, a stud rigid with the pawl and slidingly engaging the slot in the rotary member and adapted to be shifted along said slot by the translational movement of the worm under the action of the elastic means on the upper slot, the amount of shifting of the stud depending on the angular setting of the slot with reference to the plane of the ratchet wheel and said shifting of the stud constraining the pawl to drive the ratchet wheel and the worm through a corresponding angle and thereby to produce a corresponding shifting of the inoperative position of the upper slide.

References Cited in the file of this patent

UNITED STATES PATENTS

| 796,171 | Ambrose | Aug. 1, 1905 |
| 2,143,794 | Ogilvie | Jan. 10, 1939 |
| 2,334,616 | Fiorelli | Nov. 16, 1943 |
| 2,379,370 | Metz | June 26, 1945 |
| 2,396,631 | Andresen | Mar. 19, 1946 |
| 2,527,397 | Castelli | Oct. 24, 1950 |
| 2,576,570 | Castelli | Nov. 27, 1951 |
| 2,660,737 | Escure | Dec. 1, 1953 |
| 2,668,303 | Christen | Feb. 9, 1954 |

FOREIGN PATENTS

| 479,725 | Great Britain | Feb. 10, 1938 |
| 867,934 | Germany | Jan. 8, 1953 |